(12) United States Patent
Aoyama et al.

(10) Patent No.: US 11,446,765 B2
(45) Date of Patent: Sep. 20, 2022

(54) METHOD OF PRODUCING CLAD LAYER AND DEVICE FOR PRODUCING THE SAME

(71) Applicant: TOYOTA JIDOSHA KABUSHIKI KAISHA, Toyota (JP)

(72) Inventors: Hironori Aoyama, Toyota (JP); Yasuhiro Yamamoto, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 644 days.

(21) Appl. No.: 15/924,453

(22) Filed: Mar. 19, 2018

(65) Prior Publication Data
US 2018/0272471 A1  Sep. 27, 2018

(30) Foreign Application Priority Data

Mar. 22, 2017  (JP) .............................. JP2017-055701

(51) Int. Cl.
*B23K 26/342* (2014.01)
*B23K 26/06* (2014.01)
(Continued)

(52) U.S. Cl.
CPC ........ *B23K 26/342* (2015.10); *B23K 26/0626* (2013.01); *B23K 26/0869* (2013.01); *B23K 26/10* (2013.01); *B23K 26/144* (2015.10); *B23K 26/34* (2013.01); *F02M 61/18* (2013.01); *B33Y 10/00* (2014.12); *B33Y 30/00* (2014.12); *B33Y 50/02* (2014.12); *B33Y 70/00* (2014.12); *F02M 61/166* (2013.01); *F02M 2200/9092* (2013.01); *Y02P 10/25* (2015.11)

(58) Field of Classification Search
CPC .. B23K 26/1464; B23K 26/342; B23K 26/10; B23K 26/0869; B23K 26/0626; B23K 26/144; B33Y 10/00; B33Y 70/00; B33Y 50/02; B33Y 30/00
USPC ............. 427/554, 555, 556; 219/69.17, 73.1, 219/73.21, 76.1, 76.14, 121.61, 121.64, 219/121.66, 121.73, 121.85, 121.84, 219/137.2
See application file for complete search history.

(56) References Cited

U.S. PATENT DOCUMENTS 4,723,518 A   2/1988  Kawasaki et al.
5,911,949 A   6/1999  Ninomiya et al.
(Continued)

FOREIGN PATENT DOCUMENTS

CN   103121103 A   5/2013
CN   103658659 A   3/2014
(Continued)

OTHER PUBLICATIONS

Machine Translation of JP2008264842; translated Nov. 2020 (Year: 2020).*

(Continued)

*Primary Examiner* — Tu B Hoang
*Assistant Examiner* — Thomas J Ward
(74) *Attorney, Agent, or Firm* — Sughrue Mion, PLLC

(57) ABSTRACT

A first metal powder is supplied to a substrate to form a beginning part of a clad layer. After the beginning part is formed, the second metal powder is supplied to the substrate. A concentration of at least one of Si, Ni, Mo, and Al in the first metal powder is lower than a concentration thereof in the second metal powder.

13 Claims, 23 Drawing Sheets

(51) Int. Cl.
  *B23K 26/144* (2014.01)
  *B23K 26/10* (2006.01)
  *B23K 26/08* (2014.01)
  *F02M 61/18* (2006.01)
  *B23K 26/34* (2014.01)
  *B33Y 70/00* (2020.01)
  *B33Y 30/00* (2015.01)
  *B33Y 10/00* (2015.01)
  *B33Y 50/02* (2015.01)
  *F02M 61/16* (2006.01)

(56) References Cited

U.S. PATENT DOCUMENTS

| | | | | |
|---|---|---|---|---|
| 6,114,053 | A * | 9/2000 | Matsuyama | B32B 15/017 |
| | | | | 123/188.8 |
| 2014/0015172 | A1* | 1/2014 | Sidhu | B22F 10/20 |
| | | | | 264/497 |
| 2015/0034604 | A1* | 2/2015 | Subramanian | B23K 26/0006 |
| | | | | 219/73.21 |
| 2015/0196975 | A1 | 7/2015 | Sato et al. | |

FOREIGN PATENT DOCUMENTS

| | | | |
|---|---|---|---|
| CN | 203569188 U | 4/2014 | |
| CN | 104001917 A | 8/2014 | |
| JP | 62-021465 A | 1/1987 | |
| JP | 8-224680 A | 9/1996 | |
| JP | 9-285884 A | 11/1997 | |
| JP | 10-96037 A | 4/1998 | |
| JP | 2002-103068 A | 4/2002 | |
| JP | 3409631 B2 | 5/2003 | |
| JP | 2006-98085 A | 4/2006 | |
| JP | 2008264842 * | 11/2008 | ............... B22F 5/00 |
| JP | 2015-131319 A | 7/2015 | |
| JP | 2016-513200 A | 5/2016 | |
| WO | 2014/121060 A1 | 8/2014 | |
| WO | 2015/094720 A1 | 6/2015 | |

OTHER PUBLICATIONS

U.S. Appl. No. 15/965,354 Hironori Aooyama, et al., filed Apr. 27, 2018.

* cited by examiner

WHEN GENERAL PART AND END PART ARE PROCESSED

FIG. 11

|  |  | COMPONENT (mass%) | | | | | |
|---|---|---|---|---|---|---|---|
|  |  | Cu | Ni | Si | Mo | Fe | Al |
| EXAMPLE 1 | FIRST METAL POWDER | Bal | 16.9 | 3.2 | 6.0 | 9.0 | 0.0 |
|  | (MAGNITUDE RELATIONSHIP) |  | < | < | < | = | < |
|  | SECOND METAL POWDER | Bal | 18.5 | 4.0 | 10.0 | 9.0 | 3.0 |
| COMPARATIVE EXAMPLE 1 | (MAGNITUDE RELATIONSHIP) |  | = | = | = | = | < |
|  | METAL POWDER | Bal | 18.5 | 4.0 | 10.0 | 9.0 | 4.0 |

FIG. 13

| | | REFERENCE | CONTROL FACTORS | | | | | | | RESULT INDICATORS | | |
|---|---|---|---|---|---|---|---|---|---|---|---|---|
| | | Al SOLID SOLUBILITY LIMIT OF Cu | COMPONENT (mass%) | | | | | | | FUNCTION | | QUALITY |
| | | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 2 | FIRST METAL POWDER | 4.9 | Bal | 16.9 | 3.2 | 6.0 | 9.0 | 0.0 | | 371 | 16.8% | 0 |
| | (MAGNITUDE RELATIONSHIP) | | | < | < | < | = | < | | | | |
| | SECOND METAL POWDER | 1.6 | Bal | 18.5 | 4.0 | 10.0 | 9.0 | 4.0 | | | | |
| | (MAGNITUDE RELATIONSHIP) | | | = | = | = | = | = | | = | = | < |
| COMPARATIVE EXAMPLE 1 | METAL POWDER | 1.6 | Bal | 18.5 | 4.0 | 10.0 | 9.0 | 4.0 | | 371 | 16.8% | 19 |

FIG. 14

| | | REFERENCE | CONTROL FACTORS | | | | | | | RESULT INDICATORS | | |
|---|---|---|---|---|---|---|---|---|---|---|---|---|
| | | | | COMPONENT (mass%) | | | | | | FUNCTION | | QUALITY |
| | | Al SOLID SOLUBILITY LIMIT OF Cu | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 2 | FIRST METAL POWDER | 4.9 | Bal | 16.9 | 3.2 | 6.0 | 9.0 | 0.0 | | 371 | 16.8% | 0 |
| | (MAGNITUDE RELATIONSHIP) | | | < | < | < | = | < | | | | |
| | SECOND METAL POWDER | 1.6 | Bal | 18.5 | 4.0 | 10.0 | 9.0 | 4.0 | | | | |
| COMPARATIVE EXAMPLE 2 | (MAGNITUDE RELATIONSHIP) | | | > | > | > | = | > | | 274 | 13.7% | 0 |
| | METAL POWDER | 4.9 | Bal | 16.9 | 3.2 | 6.0 | 9.0 | 0.0 | | | | |

FIG. 15

| | REFERENCE | CONTROL FACTORS | | | | | | | RESULT INDICATORS | | |
|---|---|---|---|---|---|---|---|---|---|---|---|
| | Al SOLID SOLUBILITY LIMIT OF Cu | COMPONENT (mass%) | | | | | | | FUNCTION | | QUALITY |
| | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 3 — FIRST METAL POWDER | 4.4 | Bal | 15.2 | 3.2 | 6.0 | 9.0 | 0.0 | | 321 | 14.5% | 0 |
| (MAGNITUDE RELATIONSHIP) | | | = | < | = | = | = | | = | = | |
| SECOND METAL POWDER | 2.8 | Bal | 15.2 | 4.0 | 6.0 | 9.0 | 0.0 | | | | |
| COMPARATIVE EXAMPLE 3 — (MAGNITUDE RELATIONSHIP) | | | = | = | = | = | = | | | | < |
| METAL POWDER | 2.8 | Bal | 15.2 | 4.0 | 6.0 | 9.0 | 0.0 | | 321 | 14.5% | 2 |

FIG. 16

| | REFERENCE | CONTROL FACTORS | | | | | | | RESULT INDICATORS | | |
|---|---|---|---|---|---|---|---|---|---|---|---|
| | Al SOLID SOLUBILITY LIMIT OF Cu | COMPONENT (mass%) | | | | | | | FUNCTION | | QUALITY |
| | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 4 — FIRST METAL POWDER | 4.4 | Bal | 15.2 | 3.2 | 6.0 | 9.0 | 0.0 | | 280 | 19.7% | 0 |
| (MAGNITUDE RELATIONSHIP) | | | = | = | < | = | = | | | | |
| SECOND METAL POWDER | 3.9 | Bal | 15.2 | 3.2 | 8.0 | 9.0 | 0.0 | | | | |
| COMPARATIVE EXAMPLE 4 — (MAGNITUDE RELATIONSHIP) | | | = | = | = | = | = | | = | = | < |
| METAL POWDER | 3.9 | Bal | 15.2 | 3.2 | 8.0 | 9.0 | 0.0 | | 260 | 19.7% | 1 |

FIG. 17

| | REFERENCE | CONTROL FACTORS | | | | | | | RESULT INDICATORS | | |
|---|---|---|---|---|---|---|---|---|---|---|---|
| | Al SOLID SOLUBILITY LIMIT OF Cu | COMPONENT (mass%) | | | | | | | FUNCTION | | QUALITY |
| | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 5 — FIRST METAL POWDER | 4.4 | Bal | 15.2 | 3.2 | 6.0 | 9.0 | 0.0 | | 296 | 14.5% | 0 |
| (MAGNITUDE RELATIONSHIP) | | | | | | | < | | | | |
| EXAMPLE 5 — SECOND METAL POWDER | 0.4 | Bal | 15.2 | 3.2 | 6.0 | 9.0 | 4.0 | | | | |
| (MAGNITUDE RELATIONSHIP) | | | = | = | = | = | = | | = | = | |
| COMPARATIVE EXAMPLE 5 — METAL POWDER | 0.4 | Bal | 15.2 | 3.2 | 6.0 | 9.0 | 4.0 | | 296 | 14.5% | 15 |

FIG. 18

| | REFERENCE | CONTROL FACTORS | | | | | | | RESULT INDICATORS | | |
|---|---|---|---|---|---|---|---|---|---|---|---|
| | Al SOLID SOLUBILITY LIMIT OF Cu | COMPONENT (mass%) | | | | | | | FUNCTION | | QUALITY |
| | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 6 — FIRST METAL POWDER | 4.4 | Bal | 16.9 | 3.2 | 6.0 | 9.0 | 0.0 | | 326 | 19.3% | 0 |
| (MAGNITUDE RELATIONSHIP) | | | = | < | < | = | = | | | | |
| EXAMPLE 6 — SECOND METAL POWDER | 2.9 | Bal | 16.9 | 4.0 | 8.0 | 9.0 | 0.0 | | | | |
| (MAGNITUDE RELATIONSHIP) | | | = | = | = | = | = | | | | |
| COMPARATIVE EXAMPLE 6 — METAL POWDER | 2.9 | Bal | 16.9 | 4.0 | 8.0 | 9.0 | 0.0 | | 326 | 19.3% | 5 |

FIG. 19

| | REFERENCE | CONTROL FACTORS | | | | | | | RESULT INDICATORS | | |
|---|---|---|---|---|---|---|---|---|---|---|---|
| | Al SOLID SOLUBILITY LIMIT OF Cu | COMPONENT (mass%) | | | | | | | FUNCTION | | QUALITY |
| | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 7 — FIRST METAL POWDER | 4.9 | Bal | 16.9 | 3.2 | 6.0 | 9.0 | 0.0 | | 349 | 14.9% | 0 |
| (MAGNITUDE RELATIONSHIP) | | | < | < | = | = | = | | | | |
| SECOND METAL POWDER | 2.7 | Bal | 18.6 | 4.0 | 6.0 | 9.0 | 0.0 | | | | |
| COMPARATIVE EXAMPLE 7 — (MAGNITUDE RELATIONSHIP) | | | = | = | = | = | = | | = | = | < |
| METAL POWDER | 2.7 | Bal | 18.6 | 4.0 | 6.0 | 9.0 | 0.0 | | 349 | 14.9% | 5 |

FIG. 20

| | REFERENCE | CONTROL FACTORS | | | | | | | RESULT INDICATORS | | |
|---|---|---|---|---|---|---|---|---|---|---|---|
| | Al SOLID SOLUBILITY LIMIT OF Cu | COMPONENT (mass%) | | | | | | | FUNCTION | | QUALITY |
| | | Cu | Ni | Si | Mo | Fe | Al | | HARDNESS OF MATRIX (Hv 0.1) | AREA RATIO OF HARD PARTICLES | NUMBER OF OCCURRENCES OF CRACKS |
| EXAMPLE 8 | FIRST METAL POWDER | 4.9 | Bal | 16.9 | 3.2 | 6.0 | 9.0 | 0.0 | 331 | 22.3% | 0 |
| | (MAGNITUDE RELATIONSHIP) | | | < | < | < | = | = | | | |
| | SECOND METAL POWDER | 3.2 | Bal | 18.5 | 4.0 | 10.0 | 9.0 | 0.0 | | | |
| COMPARATIVE EXAMPLE 8 | (MAGNITUDE RELATIONSHIP) | | | = | = | = | = | = | = | = | < |
| | METAL POWDER | 3.2 | Bal | 18.5 | 4.0 | 10.0 | 9.0 | 0.0 | 331 | 22.3% | 4 |

METHOD OF PRODUCING CLAD LAYER AND DEVICE FOR PRODUCING THE SAME

INCORPORATION BY REFERENCE

The disclosure of Japanese Patent Application No. 2017-055701 filed on Mar. 22, 2017 including the specification, drawings and abstract is incorporated herein by reference in its entirety.

BACKGROUND

1. Technical Field

The present disclosure relates to a method of producing a clad layer and a device for producing the same.

2. Description of Related Art

For example, in order to improve durability of a valve seat of a cylinder head for an engine and increase a degree of freedom in designing thereof, laser processing is known in which a laser beam is emitted to a valve seat while, for example, a powder cladding material is supplied, the valve seat and the laser beam are rotated in a relative manner, and thus a clad layer is formed. This laser processing is a technology in which machining processing necessary for a combustion chamber of an engine is performed, for example, for a cylinder head on which a valve hole forming process or the like is performed, a laser beam is emitted to a region that will become the valve seat while a powder cladding material that is made of a copper alloy or the like and has wear resistance is supplied, and a ring-shaped clad layer that will finally become the valve seat, that is, a clad bead part, is formed and is generally referred to as laser clad processing or clad processing.

Incidentally, when the ring-shaped clad layer described above is formed, it is necessary to ensure an amount of cladding for superimposing an end part on a beginning part serving as a cladding operation start part of a clad layer, and forming an overlapping part. However, in the overlapping part, there is a problem of the occurrence of defects such as unwelded parts and cracks.

In order to address such a problem, in Japanese Patent No. 3409631 (JP 3409631 B), a technology in which, when a clad layer is formed by superimposing an end part serving as a cladding operation end part on a beginning part serving as a cladding operation start part of a clad layer, an inclination angle of a surface of a beginning part with respect to a surface of a metal substrate is adjusted to be within a predetermined range is proposed.

SUMMARY

However, like in the proposed technology described in JP 3409631 B, it is very difficult to precisely adjust an inclination angle of the surface of the beginning part of the clad layer. In addition, compared to an intake side, wear resistance needs to be ensured for an exhaust side under a high temperature environment. When a material (for example, a material including large amounts of Ni, Si, Mo, and Al) in which an area ratio of hard particles is high, the hardness of a matrix (part of a base other than the hard particles) is high, and adhesion wear occurring between a valve and a surface of the valve seat is prevented is used as a cladding material suitable for a valve seat on the exhaust side to form the clad layer, there is still a problem of many cracks occurring in the beginning part described above.

More specifically, when Ni and Si contents increase, a mesh-like structure of Cu—Ni—Si is likely to be formed and the hardness of the matrix is improved. In addition, when a Mo content increases, an area ratio of hard particles including Mo—Si—Fe and Mo—Ni—Si increases. In addition, when an Al content increases, a solid solution strengthening structure of Cu—Ni—Al is likely to be formed and the hardness of the matrix is improved.

However, in the laser clad processing, since a Cu-based powder cladding material is melted and welded to a cylinder head made of Al, mixing of an Al component into a clad structure is unavoidable (this phenomenon is called Al dilution). When an amount of the Al component mixed in exceeds a specified value (Al solid solubility limit of Cu), intermetallic compounds (AlNi, CuAl, and the like) are formed, a decrease in material elongation is caused and an increase in residual tensile stress is caused. If heat shrinkage is applied to this part when the second layer (end part) is clad, there is a possibility of cracks occurring due to this load. In particular, since the beginning part of the clad layer has a small volume or a small cross-sectional area, an Al dilution component is higher (for example, an Al dilution component of a general part is about 0% to 1%, and an Al dilution component of the beginning part is about 3% to 5%) than that of other parts, and a decrease in material elongation and an increase in residual tensile stress become larger, and thus cracks are more likely to occur.

That is, when a ring-shaped clad layer described above is formed, since a beginning part which is an operation start part of the clad layer has a smaller volume or cross-sectional area of the clad layer than a general part which is a part after the beginning part is formed, it is easily influenced by Al dilution from the Al substrate. When an Al concentration is high, since intermetallic compounds (such as CuAl) are likely to be formed and cracks are likely to occur in the clad layer, the durability of the valve seat deteriorates.

The present disclosure provides a method of producing a clad layer through which it is possible to reduce cracking in a beginning part of the clad layer described above and a device for producing the same.

A first aspect of the present disclosure relates to a method of producing a clad layer including supplying copper-based metal powder to a surface of a substrate made of aluminum or aluminum alloy, emitting a laser beam to the supplied metal powder, and melting the metal powder and moving a supply position of the metal powder and an emission position of the laser beam in a predetermined direction along a surface of the substrate and forming a clad layer on the surface of the substrate in the predetermined direction. The metal powder includes a first metal powder and a second metal powder. In the production method, the first metal powder is supplied to the substrate to form a beginning part of the clad layer, and after the beginning part is formed, and the second metal powder is supplied to the substrate. A concentration of at least one of Si, Ni, Mo, and Al in the first metal powder is lower than a concentration thereof in the second metal powder.

In the method of producing a clad layer, concentrations of Si, Ni, Mo, and Al in the first metal powder may be lower than concentrations of Si, Ni, Mo, and Al in the second metal powder.

In the method of producing a clad layer, a Si concentration in the first metal powder may be lower than a Si concentration in the second metal powder.

In the method of producing a clad layer, a Mo concentration in the first metal powder may be lower than a Mo concentration in the second metal powder.

In the method of producing a clad layer, an Al concentration in the first metal powder may be lower than an Al concentration in the second metal powder.

In the method of producing a clad layer, Si and Mo concentrations in the first metal powder may be lower than Si and Mo concentrations in the second metal powder.

In the method of producing a clad layer, Si and Ni concentrations in the first metal powder may be lower than Si and Ni concentrations in the second metal powder.

In the method of producing a clad layer, Si, Ni, and Mo concentrations in the first metal powder may be lower than Si, Ni, and Mo concentrations in the second metal powder.

In the method of producing a clad layer, an Al solid solubility limit of the first metal powder may be higher than an Al solid solubility limit of the second metal powder.

In the method of producing a clad layer, a laser output to the first metal powder may be set to be lower than a laser output to the second metal powder In the method of producing a clad layer, the second metal powder may be supplied to the beginning part of the clad layer to form an end part of the clad layer.

In addition, a second aspect of the present disclosure relates to a device for producing a clad layer including a powder supply unit configured to supply copper-based metal powder to a surface of a substrate made of aluminum or an aluminum alloy and a laser emission unit configured to emit a laser beam to the metal powder supplied from the powder supply unit. The metal powder includes a first metal powder and a second metal powder. The laser emission unit emits a laser beam to the metal powder such that the metal powder is melted. The production device includes a first supply unit configured to supply the first metal powder to the powder supply unit and a second supply unit configured to supply the second metal powder to the powder supply unit. A concentration of at least one of Si, Ni, Mo, and Al in the first metal powder is lower than a concentration thereof in the second metal powder. The production device includes a switching unit configured to switch between supply of the first metal powder and supply of the second metal powder to the powder supply unit and a control unit configured to control the switching unit such that, when a beginning part of a clad layer is formed, the first metal powder is supplied from the first supply unit to the powder supply unit, and after the beginning part is formed, and the second metal powder is supplied from the second supply unit to the powder supply unit. The production device moves a supply position of the metal powder and an emission position of the laser beam in a predetermined direction along a surface of the substrate and forms a clad layer on the surface of the substrate in the predetermined direction.

In the device for producing a clad layer, the control unit may control a laser output of the laser beam such that a laser output to the first metal powder when the beginning part of the clad layer is formed is lower than a laser output to the second metal powder after the beginning part is formed.

According to the present disclosure, since a concentration of at least one of Si, Ni, Mo, and Al in the first metal powder supplied to the beginning part of the clad layer is lower than a concentration thereof in the second metal powder supplied to the general part after the beginning part is formed, it is possible to increase an Al solid solubility limit of the beginning part. Therefore, since formation of intermetallic compounds due to Al dilution from the substrate in the beginning part can be reduced, it is possible to reduce cracking in the beginning part of the clad layer described above.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 11 is a diagram showing powder alloy components of metal powders of Example 1 and Comparative Example 1;

FIG. 13 is a diagram showing powder alloy components of metal powders and experimental results of function features and a quality feature in Example 2 and Comparative Example 1;

FIG. 14 is a diagram showing powder alloy components of metal powders and experimental results of function features and a quality feature in Example 2 and Comparative Example 2;

FIG. 15 is a diagram showing powder alloy components of metal powders and experimental results of function features and a quality feature in Example 3 and Comparative Example 3;

FIG. 16 is a diagram showing powder alloy components of metal powders and experimental results of function features and a quality feature in Example 4 and Comparative Example 4;

FIG. 17 is a diagram showing powder alloy components of metal powders and experimental results of function features and a quality feature in Example 5 and Comparative Example 5;

FIG. 18 is a diagram showing powder alloy components of metal powders and experimental results of function features and a quality feature in Example 6 and Comparative Example 6;

FIG. 19 is a diagram showing powder alloy components of metal powders and experimental results of function features and a quality feature in Example 7 and Comparative Example 7; and FIG. 20 is a diagram showing powder alloy components of metal powders and experimental results of function features and a quality feature in Example 8 and Comparative Example 8.

DETAILED DESCRIPTION OF EMBODIMENTS

Embodiments of the present disclosure will be described below with reference to the drawings.

First, an example of a laser clad processing device to which a method of producing a clad layer of the present disclosure is applied will be generally described with reference to FIG. 1 to FIGS. 3A and 3B.

Figure 1:
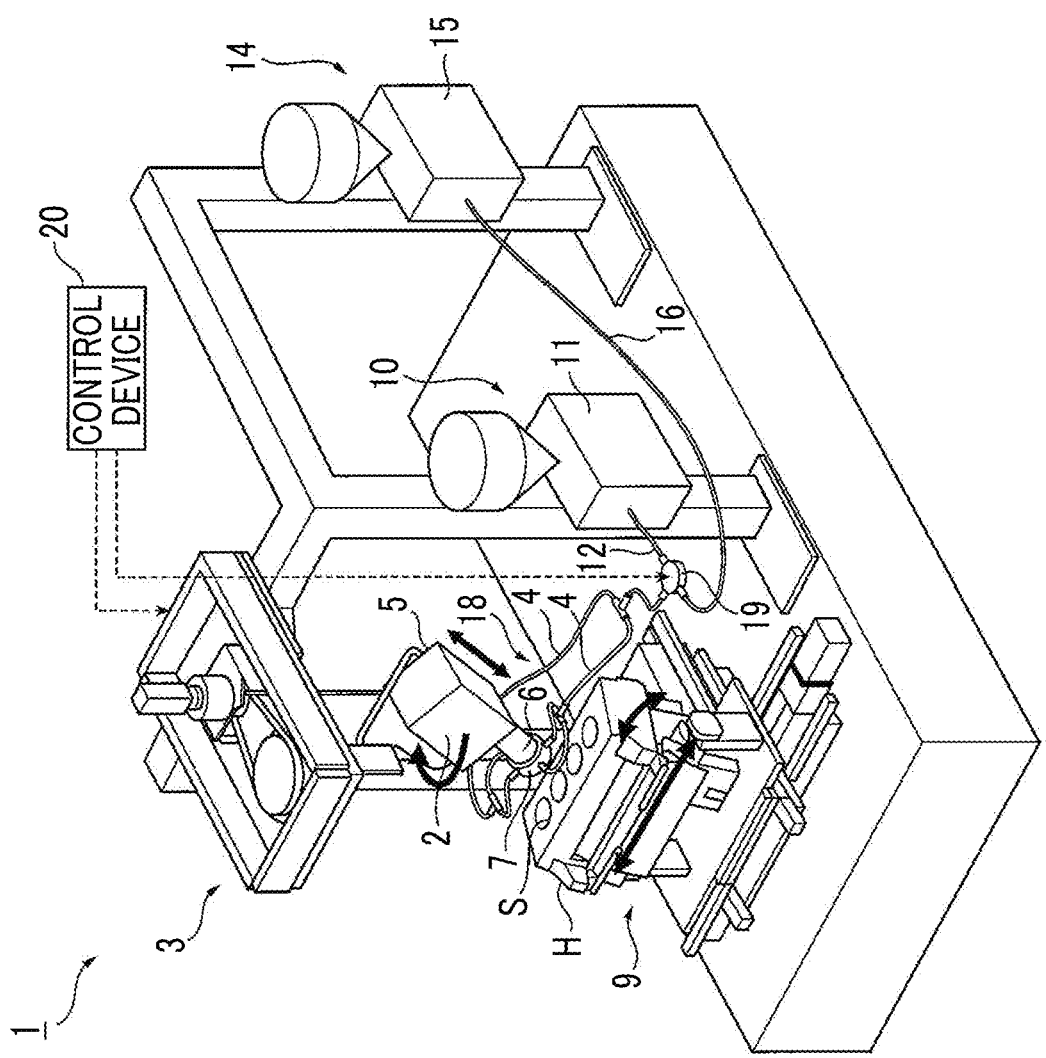
FIG. 1 is a perspective view schematically showing a main configuration of a laser clad processing device to which a method of producing a clad layer of the present disclosure is applied.
Figure 2:
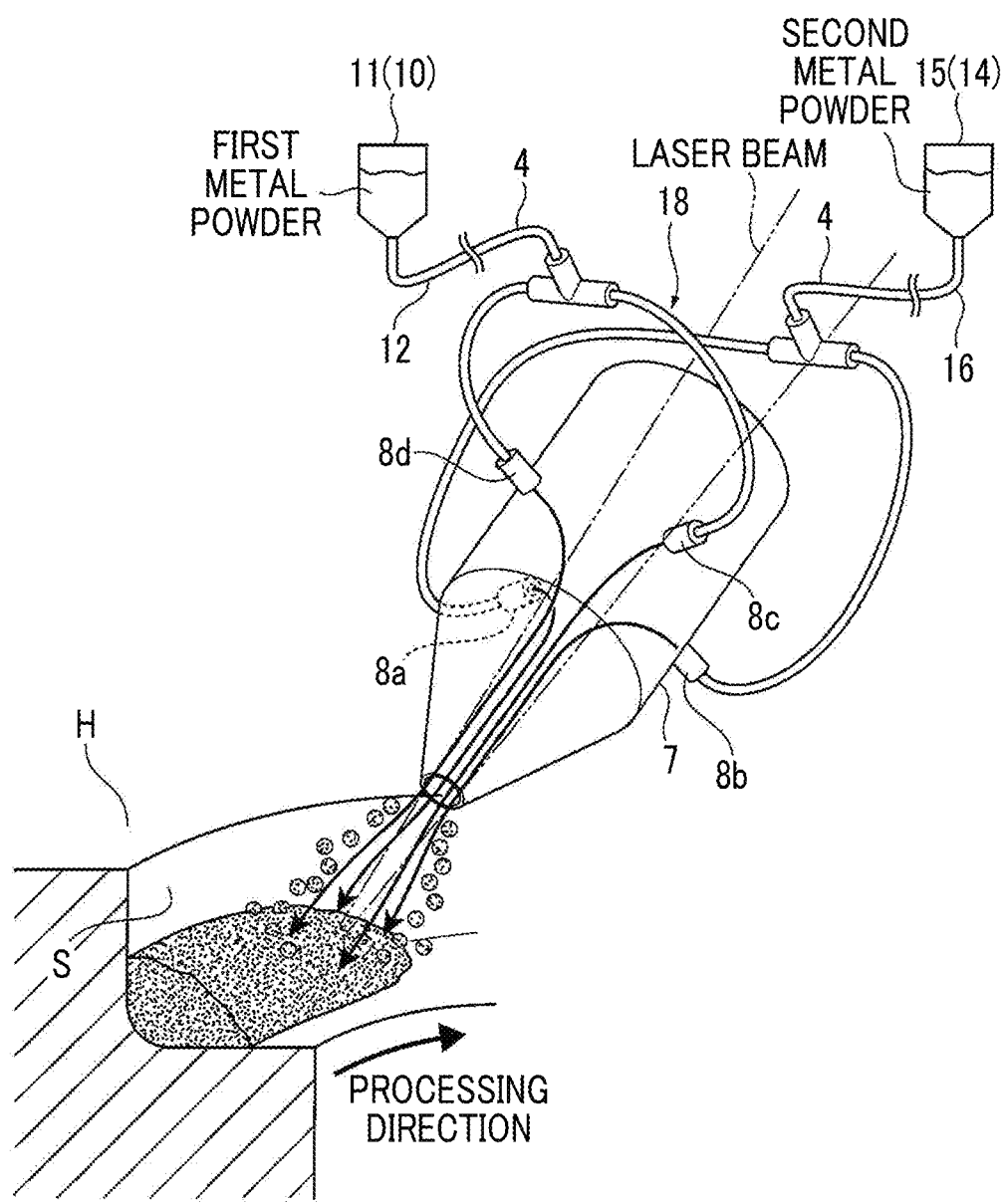
FIG. 2 is a main part enlarged view schematically showing a method of producing a clad layer using the laser clad processing device shown in FIG. 1.

FIG. 1 is a perspective view schematically showing a main configuration of a laser clad processing device to which a method of producing a clad layer of the present disclosure is applied, and FIG. 2 is a main part enlarged view schematically showing a method of producing a clad layer using the laser clad processing device shown in FIG. 1.

Figure 3A:
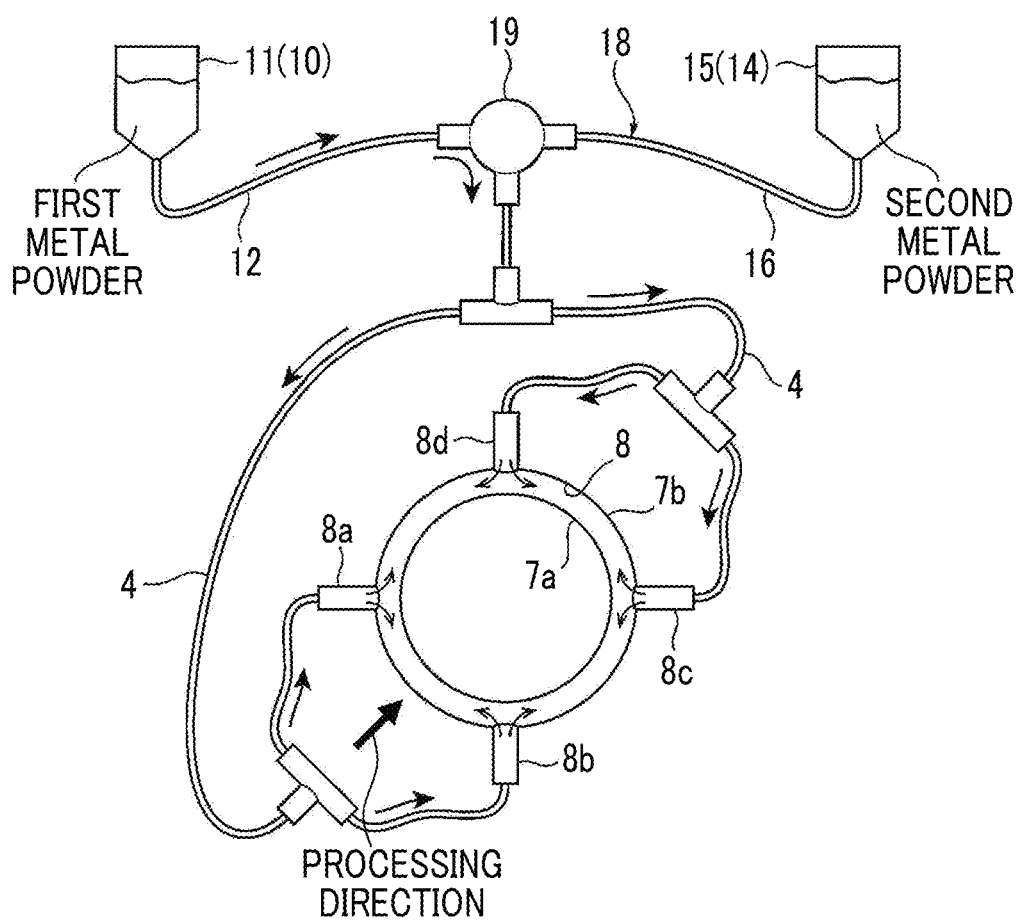
FIG. 3A is a diagram schematically showing an internal structure of a coaxial nozzle shown in FIG. 2 and a supply path of metal powder (when a beginning part is processed)
Figure 3B:
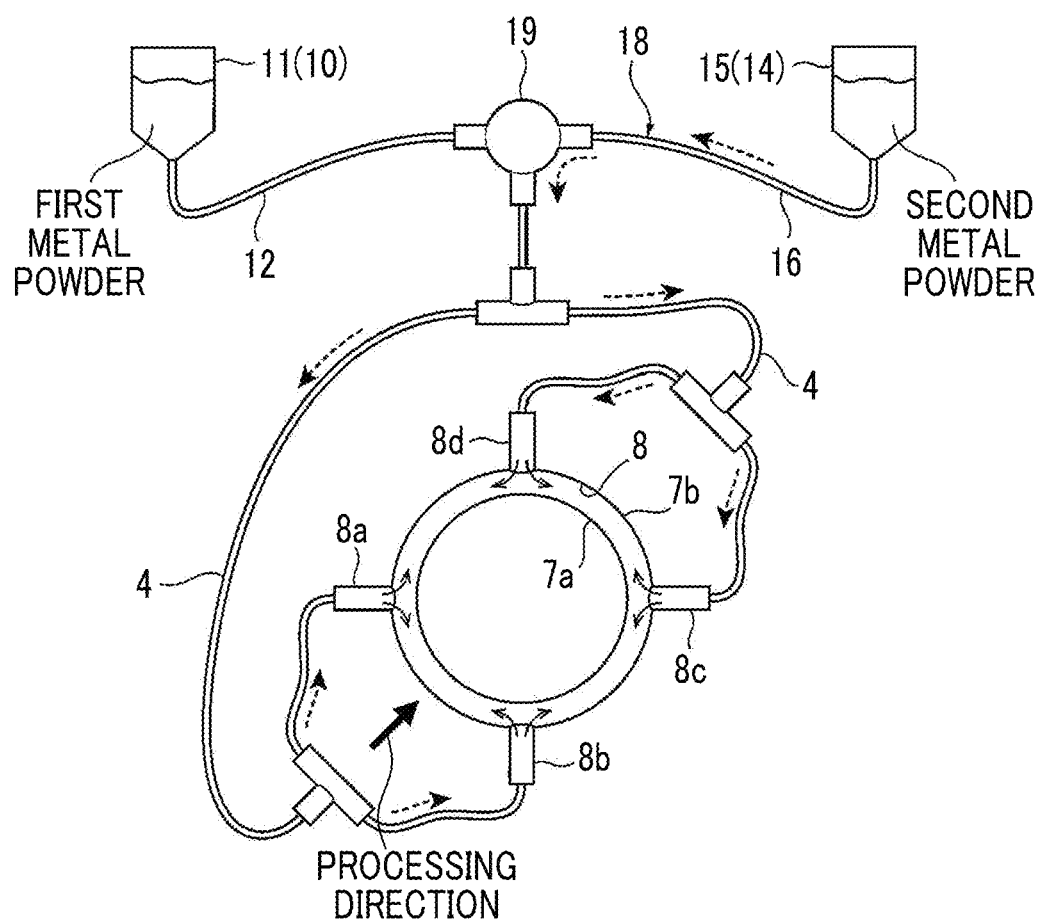
FIG. 3B is a diagram schematically showing an internal structure of the coaxial nozzle shown in FIG. 2 and the supply path of metal powder (when a general part and an end part are processed)

In addition, FIGS. 3A and 3B are diagrams schematically showing an internal structure of a coaxial nozzle shown in FIG. 2 and a supply path of metal powder, FIG. 3A shows a diagram when a beginning part is processed, and FIG. 3B shows a diagram when a general part and an end part are processed after the beginning part is processed.

A laser clad processing device 1 shown in FIG. 1 is a device configured to perform laser clad processing (clad processing) on a valve seat part S of a cylinder head H made of, for example, aluminum (Al) or an aluminum alloy, (hereinafter referred to as a substrate or an Al substrate). The device mainly includes a cylinder head holding device 9 that tilts and holds the cylinder head H, a laser processing head (laser emission unit and powder supply unit) 2 through which metal powder (a metal material containing copper as a main component) is discharged while emitting a laser beam to a processing part (a surface of a substrate), a rotation device 3 configured to hold the laser processing head 2 inclined in a vertical direction and rotate it around a vertical axis, and move a position at which metal powder is supplied and a position at which a laser beam is emitted from the laser processing head 2 in a processing part in a circumferential direction (rotation direction), two supply devices (a first supply unit and a second supply unit) 10 and 14 configured to supply metal powder to the laser processing head 2, and a control device (control unit) 20 configured to control conditions in which metal powder is supplied from the supply devices 10 and 14 to the laser processing head 2.

The cylinder head holding device 9 tilts the cylinder head H so that a central axis of the valve seat part S is in a vertical direction and two-dimensionally moves the cylinder head H in a horizontal direction so that a central axis of the valve seat part S is coincident with a rotational axis of the laser processing head 2.

The laser processing head 2 mainly includes a laser oscillation unit 5 configured to generate a laser beam as a heating source of metal powder, an optical system unit 6 in which a condenser lens for condensing a laser beam is included, and a coaxial nozzle 7 having a double-pipe structure through which a laser beam passes and metal powder is discharged from the surroundings of the laser beam.

In addition, the supply devices 10 and 14 mainly include feeders 11 and 15 in which metal powder supplied to the laser processing head 2 is stored. The feeders 11 and 15 and the coaxial nozzle 7 of the laser processing head 2 are connected through a supply tube 18 and a switching valve (switching unit) 19 provided on the supply tube 18 (detailed structure will be described below).

In the laser clad processing device 1, metal powder in an amount corresponding to a clad layer formed in a processing part is supplied from the feeders 11 and 15 to the coaxial nozzle 7 through the supply tube 18 or the like, a laser beam having an output according to the metal powder is generated by the laser oscillation unit 5, metal powder is discharged toward the laser beam from the surroundings of the laser beam while a laser beam is emitted to the processing part through the coaxial nozzle 7, and thus a ring-shaped clad layer can be formed on the valve seat part S of the cylinder head H (refer to FIG. 2).

Here, in order to form the ring-shaped clad layer, the rotation device 3 rotates the laser processing head 2 by 360° or more (for example, about 450°), and an overlapping part (for example, an overlapping part of about 90°) is formed between a start point and an end point of the processing part.

More specifically, as shown in FIGS. 3A and 3B, the coaxial nozzle 7 mainly includes a substantially circular tubular inner nozzle member 7a including a laser passage through which a laser beam passes and an outer nozzle member 7b that is externally fit to the inner nozzle member 7a. An inner circumferential surface of the outer nozzle member 7b is complementary in shape to an outer circumferential surface of the inner nozzle member 7a. The inner nozzle member 7a and the outer nozzle member 7b are disposed coaxially. A substantially annular discharge space 8 through which metal powder passes is defined between the inner nozzle member 7a and the outer nozzle member 7b. Here, the diameters of the inner nozzle member 7a and the outer nozzle member 7b decrease toward a front end side thereof.

In the discharge space 8, a plurality of supply pipes 8a to 8d are consecutively provided at substantially equal intervals in the circumferential direction (in the shown example, four supply pipes at intervals of 90°). The supply pipes 8a to 8d are connected to the switching valve 19 through a connection tube 4.

Here, in the shown example, the discharge space 8 is formed as one space. However, for example, the discharge space 8 may be divided into a plurality of small spaces (for example, four small spaces) by dividing walls provided at substantially equal intervals (for example, intervals of 90°)

in the circumferential direction, and supply pipes for supplying metal powder to the small spaces may be consecutively provided in the small spaces.

On the other hand, the feeder 11 of the supply device (first supply unit) 10 is connected to the switching valve 19 through a connection tube 12, and the feeder 15 of the supply device (second supply unit) 14 is connected to the switching valve 19 through a connection tube 16.

Thus, when the control device 20 controls switching of the switching valve 19 in conjunction with the rotation device 3 or the like, for example, the following communication states are brought about, and supply paths of metal powder from the feeders 11 and 15 to the supply pipes 8a to 8d of the coaxial nozzle 7 are switched. [First communication state] A state (a state shown in FIG. 3A) in which, when a beginning part of the clad layer is processed (that is, when a rotation angle of a processing start point of the laser processing head 2 (the coaxial nozzle 7 thereof) is a predetermined angle (for example, about 45°) or smaller), the feeder 11 (the connection tube 12 linked thereto) and the supply pipes 8a to 8d (the connection tube 4 linked thereto) communicate with each other, metal powder stored in the feeder 11 is supplied to the discharge space 8 through the supply pipes 8a to 8d, and communication between the feeder 15 (the connection tube 16 linked thereto) and the supply pipes 8a to 8d (the connection tube 4 linked thereto) is blocked. [Second communication state] A state (a state shown in FIG. 3B) in which, when a general part and an end part are processed (that is, when a rotation angle of the laser processing head 2 (the coaxial nozzle 7 thereof) is larger than a predetermined angle (for example, about 45°)) after the beginning part of the clad layer is processed, communication between the feeder 11 (the connection tube 12 linked thereto) and the supply pipes 8a to 8d (the connection tube 4 linked thereto) is blocked, and the feeder 15 (the connection tube 16 linked thereto) and the supply pipes 8a to 8d (the connection tube 4 linked thereto) communicate with each other, and metal powder stored in the feeder 15 is supplied to the discharge space 8 through the supply pipes 8a to 8d.

Figure 4A:
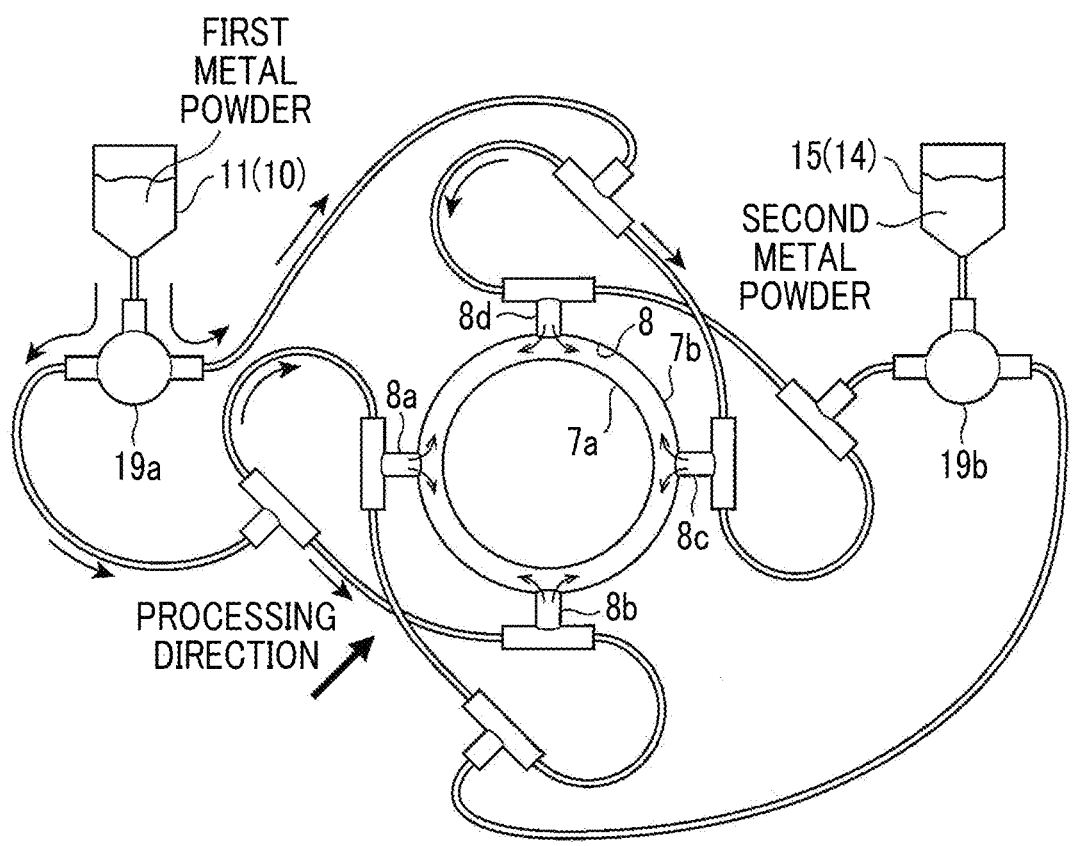
FIG. 4A is a diagram schematically showing another example of an internal structure of the coaxial nozzle and the supply path of metal powder shown in FIG. 2 (when a beginning part is processed)
Figure 4B:
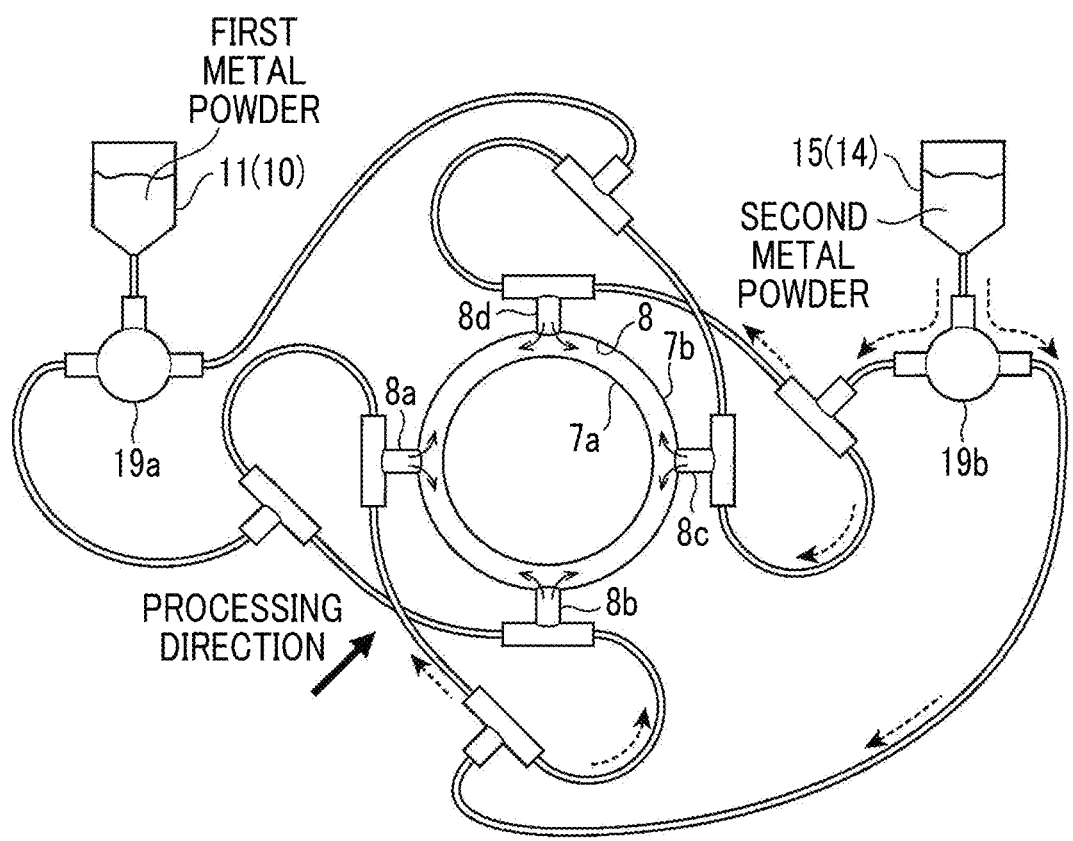
FIG. 4B is a diagram schematically showing another example of an internal structure of the coaxial nozzle and the supply path of metal powder shown in FIG. 2 (when a general part and an end part are processed)

Here, in the example shown in FIGS. 3A and 3B, one switching valve 19 is used to switch conditions (supply path) in which metal powder is supplied from the feeders 11 and 15 to the supply pipes 8a to 8d to the coaxial nozzle 7. However, for example, as shown in FIGS. 4A and 4B, supply tubes connected to supply pipes 8a to 8d may be separately connected to the feeders 11 and 15, and switching valves 19a and 19b may be provided in the supply tubes, and the two switching valves 19a and 19b may be used to switch conditions (supply paths) in which metal powder is supplied from the feeders 11 and 15 to the supply pipes 8a to 8d of the coaxial nozzle 7 (that is, the control device 20 simultaneously controls the two switching valves 19a and 19b). In addition, the switching valves may be omitted, and on and off valves for flow rate control provided on the feeders 11 and 15 may be used to switch conditions (supply path) in which metal powder is supplied from the feeders 11 and 15 to the supply pipes 8a to 8d of the coaxial nozzle 7 (that is, the control device 20 simultaneously controls on and off valves of the feeders 11 and 15).

In addition, a carrier gas pipe (not shown) through which a carrier gas including an inert gas such as nitrogen gas passes is provided in the feeders 11 and 15, and using the carrier gas, metal powder may be pressurized and supplied from the feeders 11 and 15 to the coaxial nozzle 7 through the supply tube 18 (such as the connection tubes 12 and 16) together with the carrier gas.

Here, a gas supply path through which an inert gas such as nitrogen gas passes is provided in the outer nozzle member 7b. The inert gas supplied through the gas supply path is supplied to a laser passage of the inner nozzle member 7a through a gas filling space defined between the inner nozzle member 7a and the outer nozzle member 7b and a plurality of gas discharge passages formed in the inner nozzle member 7a to communicate with the gas filling space.

If a clad layer is formed on the valve seat part S of the cylinder head H, when metal powder is supplied from the feeders 11 and 15 to the coaxial nozzle 7, the on and off valve provided on the carrier gas pipe is opened, and metal powder stored in the feeders 11 and 15 is sent to the connection tubes 12 and 16 constituting the supply tube 18 together with the carrier gas due to a pressure of the carrier gas supplied from the carrier gas pipe, and is supplied to the supply pipes 8a to 8d of the coaxial nozzle 7 through the switching valve 19 and the connection tube 4 described above. The metal powder supplied to the supply pipes 8a to 8d is introduced into the discharge space 8 and diffused or dispersed in the circumferential direction, and discharged from a discharge port on the front end side of the discharge space 8 to the outside.

The metal powder discharged through the discharge port is melted due to a laser beam that is emitted from the laser oscillation unit 5 of the laser processing head 2 and has passed through the laser passage of the inner nozzle member 7a, the melted metal powder is welded to the valve seat part S of the cylinder head H which is a processing part, the welded metal powder is cooled and solidified, and a clad layer having a predetermined thickness and exterior shape is formed on the processing part. Here, as described above, the laser passage of the inner nozzle member 7a also serves as a passage for an inert gas supplied through the gas supply path and the like, and, and an inert gas is injected to a processing part of a work piece through the laser passage during laser clad processing.

Here, an amount of metal powder sent from the feeders 11 and 15 to the connection tubes 12 and 16 (that is, the coaxial nozzle 7), and a flow rate and pressure (feeder internal pressure) of a carrier gas are managed by the feeders 11 and 15.

Next, a method of producing (forming) a clad layer using the laser clad processing device shown in FIG. 1 and an internal structure of the clad layer formed accordingly will be described in more detail.

In the present embodiment, copper-based metal powder (first metal powder) with a relatively low concentration (in other words, additive amount) of at least one of Ni, Si, Mo, and Al (preferably, all of Ni, Si, Mo, and Al) is stored in the feeder 11 of the supply device (first supply unit) 10 described above, and copper-based metal powder (second metal powder) with a relatively high concentration of at least one of Ni, Si, Mo, and Al (preferably, all of Ni, Si, Mo, and Al) is stored in the feeder 15 of the supply device (second supply unit) 14.

As described above, the control device 20 switches the switching valve 19 according to a rotation angle of the coaxial nozzle 7 of the laser processing head 2. Thus, when the beginning part of the clad layer is processed in the valve seat part S of the cylinder head H, the supply pipes 8a to 8d of the coaxial nozzle 7 communicate with the feeder 11, and the first metal powder is supplied from the feeder 11 to the coaxial nozzle 7 (the discharge space 8 thereof) (also refer to FIG. 3A). In addition, when a general part and an end part of the clad layer are processed, the supply pipes 8a to 8d of the coaxial nozzle 7 communicate with the feeder 15, and the second metal powder is supplied from the feeder 15 to the coaxial nozzle 7 (the discharge space 8 thereof) (also refer to FIG. 3B).

Therefore, when a clad layer is formed using the laser clad processing device 1 of the present embodiment, as shown in FIGS. 5 to 7, and FIG. 8, first (in the example shown in FIG. 8, from a rotation angle of 0° which is a processing start point to a rotation angle of about 45°), the first metal powder (metal powder with a relatively low concentration of Ni, Si, Mo, and Al) supplied from the feeder 11 to the coaxial nozzle 7 is melted due to a laser beam that has passed through the coaxial nozzle 7 (the inner nozzle member 7a thereof), and welded and clad to the valve seat part S of the cylinder head H, thereby forming a beginning part. Then, (in the example shown in FIG. 8, from a rotation angle of about 45° to a rotation angle of 450°), a supply path from the feeders 11 and 15 to the coaxial nozzle 7 is switched, the second metal powder (metal powder with a relatively high concentration of Ni, Si, Mo, and Al) supplied from the feeder 15 to the coaxial nozzle 7 is melted due to the laser beam and welded and clad to the valve seat part S of the cylinder head H, thereby forming a general part and an end part.

Figure 8:
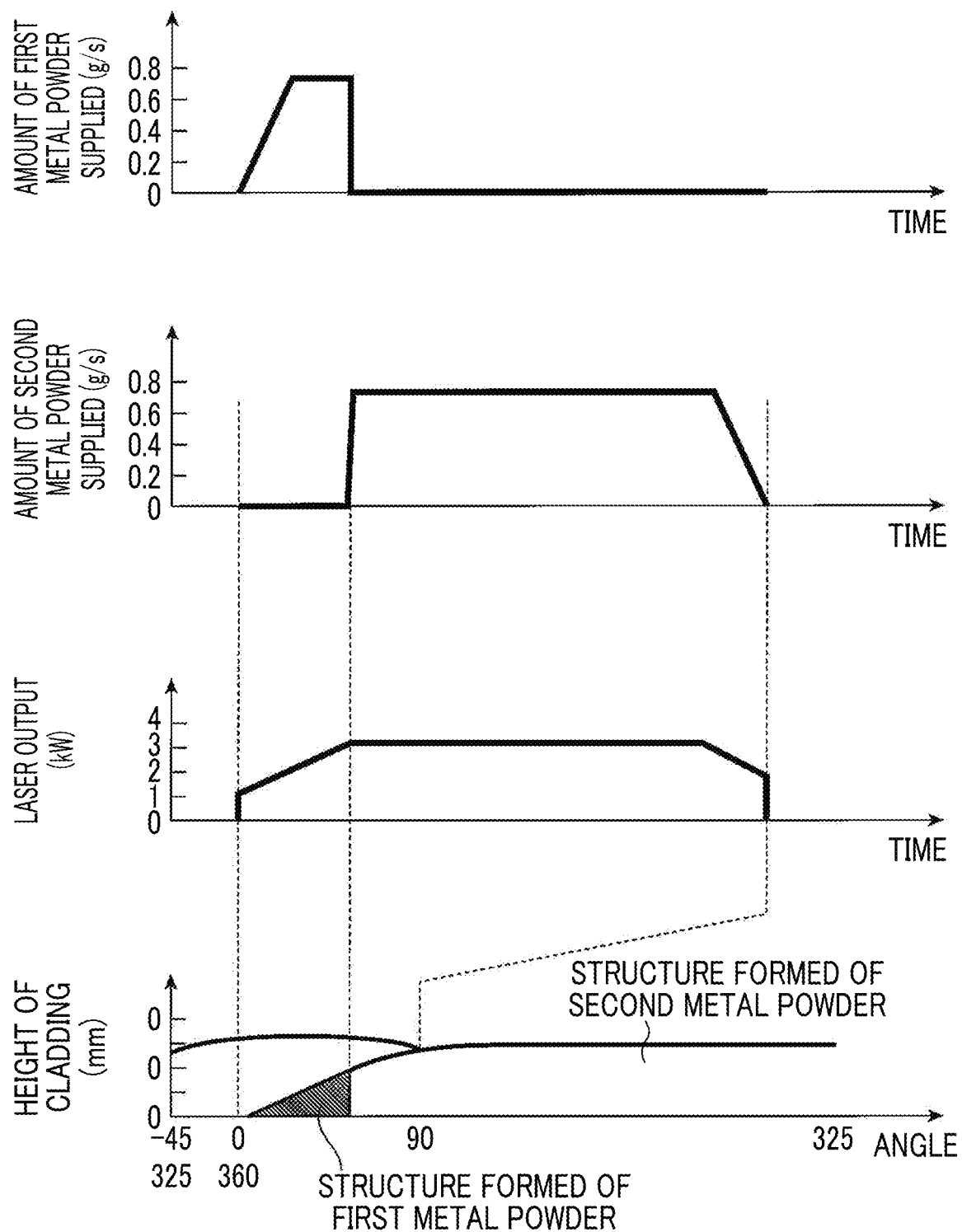
FIG. 8 is a diagram showing relationships between an amount of first metal powder supplied, an amount of second metal powder supplied, a laser output, and a clad height.

Here, in this example, as shown in FIG. 8, a laser output for the first metal powder when the beginning part is formed is set to be lower than a laser output for the second metal powder after the beginning part is formed. In other words, the control device 20 simultaneously controls a laser output of the laser processing head 2 (the laser oscillation unit 5 thereof) according to a rotation angle of the coaxial nozzle 7 of the laser processing head 2.

Figure 7:
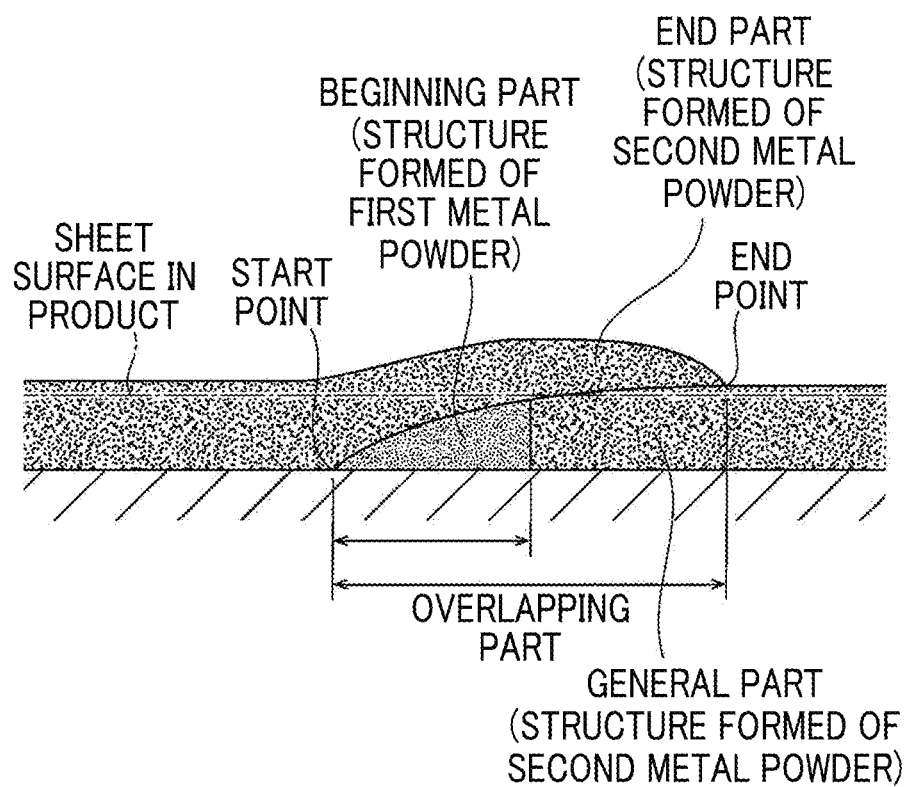
FIG. 7 is a cross-sectional view taken along the line VII-VII in FIG. 6.

Here, in the present embodiment, the "beginning part" of the clad layer refers to a region in which a height of a layer clad from a processing start point (a processing start position of the clad layer) is less than a height of a sheet surface during production (in particular, refer to FIG. 7). In addition, the "general part" of the clad layer refers to a region in which a height of a layer clad after the beginning part is formed is equal to or greater than a height of a sheet surface during production. In addition, the "end part" of the clad layer refers to a region after a part that at least overlaps the beginning part (in particular, refer to FIG. 7 and FIG. 8).

Here, a composition of powder alloy components of the first metal powder (a metal material used to form the beginning part) and the second metal powder (a metal material used to form the general part and the end part) are determined based on the following considerations.

Ni Component

When a content (proportion) of Ni increases, a mesh-like structure of Cu—Ni—Si is likely to be formed, and the strength of a matrix is improved. However, when a content (proportion) of Ni exceeds 20%, cracks are likely to occur and weldability decreases. On the other hand, when a content (proportion) of Ni decreases, formation of NiSi (nickel silicide) and formation of an AlNi compound due to an increase in an Al solid solubility limit are prevented, and the occurrence of cracks can be prevented. However, when a content (proportion) of Ni is less than 5%, since matrix strengthening is insufficient, it is not possible to withstand an engine load such as a combustion pressure. Therefore, within a range of 5.0% to 20.0%, a Ni amount in the first metal powder is relatively smaller and a Ni amount in the second metal powder is relatively larger.

Si Component

When a content (proportion) of Si increases, a mesh-like structure of Cu—Ni—Si is likely to be formed, and the strength of a matrix is improved, and weldability to Al is improved. When a content (proportion) of Si is excessively large, since an amount of nickel silicide (such as $Ni_3Si$) formed at grain boundaries of Cu—Ni crystal grains having a Cu—Ni—Si structure increases, the ductility decreases, and when a diluted substrate component (Al component) in an amount that exceeds an Al solid solubility limit of Cu is mixed in, intermetallic compounds (such as AlNi) are formed at grain boundaries, and elongation significantly decreases. In addition, even if an Al concentration is low, since high residual tensile stress is generated, cracks are likely to occur. More specifically, when a content of Si is 2.4% or less, an unwelded part is likely to be formed, and when a content of Si is 4.0% or more, cracks are likely to occur in the general part of the clad layer due to the above reasons. Therefore, within a range of 2.4% to 4.0%, a Si amount in the first metal powder is less than a Si amount in the second metal powder.

Mo Component

When a content (proportion) of Mo increases, since an area ratio of hard particles including Mo—Si—Fe and Mo—Ni—Si increases, and many hard particles are crystallized, the wear resistance is improved. However, since a toughness does not equal that of the matrix, the breaking strain decreases and cracks are likely to occur. More specifically, when a content of Mo exceeds 40.0%, since an amount of hard particles is an excess thereof, the toughness decreases and cracks are likely to occur. Therefore, within a range of 0% to 40.0%, a Mo amount in the first metal powder is less than a Mo amount in the second metal powder.

Al Component

Figure 9:
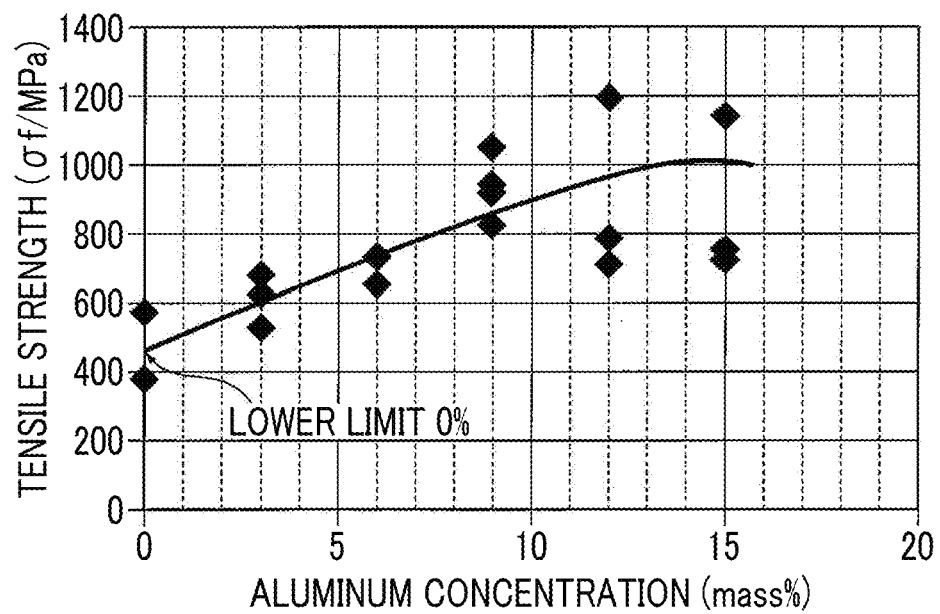
FIG. 9 is a diagram showing a relationship between an Al concentration and a tensile strength.
Figure 10:
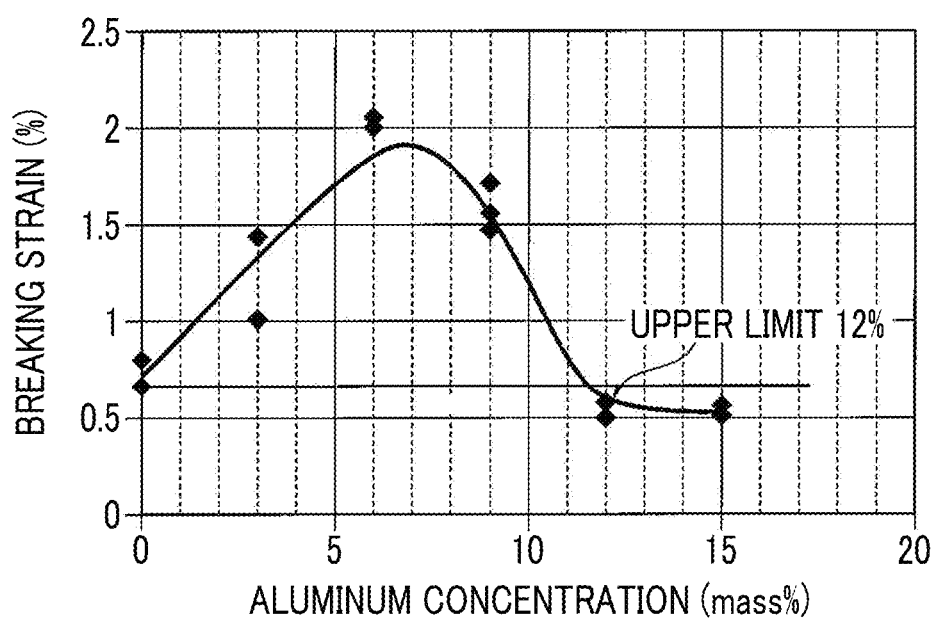
FIG. 10 is a diagram showing a relationship between an Al concentration and a breaking strain.

When a content (proportion) of Al increases, a solid solution strengthening structure of Cu—Ni—Al is likely to be formed and the strength of a matrix is improved. However, when a content (proportion) of Al is excessively large, there is more of intermetallic compound phases with low ductility such as AlNi and CuAl due to a diluted substrate component (Al component), and cracks are likely to occur. That is, although if a small amount of an Al component is added, the tensile strength is improved (refer to FIG. 9), when a content of Al exceeds 12%, the breaking strain (when this is low, cracks are likely to occur) is lower than when an Al concentration is 0% (refer to FIG. 10). Therefore, within a range of 0% to 12.0%, an Al amount in the first metal powder is relatively smaller and an Al amount in the second metal powder is relatively larger.

That is, when a clad layer is formed using the laser clad processing device 1 of the present embodiment as described above, the beginning part of the clad layer formed of the first metal powder supplied from the feeder 11 to the coaxial nozzle 7 has a structure having a relatively high Al solid solubility limit.

In addition, the general part and the end part of the clad layer formed of the second metal powder supplied from the feeder 15 to the coaxial nozzle 7 have a structure having excellent wear resistance. Specifically, a sheet surface when the clad layer formed using the laser clad processing device 1 of the present embodiment is produced has a structure formed of the second metal powder and the structure includes more Ni and Si. Therefore, a mesh-like structure of Cu—Ni—Si is likely to be formed, the hardness of a matrix is improved, and adhesion wear that occurs when the matrix is peeled off and adheres to the valve is expected to be prevented. In addition, since the structure includes more Mo, an area ratio of hard particles including Mo—Si—Fe and Mo—Ni—Si increases and wear resistance is expected to be improved. In addition, since the structure includes more Al, a solid solution strengthening structure of Cu—Ni—Al is likely to be formed, the hardness of a matrix is improved, and adhesion wear that occurs when the matrix is peeled off and adheres to the valve is expected to be prevented.

As described above, according to the present embodiment, since the first metal powder supplied to the beginning part of the clad layer has a relatively lower concentration of at least one of Si, Ni, Mo, and Al than the second metal powder supplied to the general part after the beginning part is formed, it is possible to increase an Al solid solubility limit in the beginning part. Therefore, since formation of intermetallic compounds due to Al dilution from a substrate can be reduced, it is possible to reliably reduce cracking in the beginning part of the clad layer described above.

In addition, in the present embodiment, since a supply path of metal powder from the feeders 11 and 15 of the supply devices 10 and 14 to the coaxial nozzle 7 is switched by switching the switching valve 19 (or on and off valves for flow rate control provided on the feeders 11 and 15) when the clad layer is processed, there is also an effect that it is possible to ensure productivity.

Here, while the coaxial nozzle 7 having a double-pipe structure through which a laser beam passes and metal powder is discharged from the surroundings of the laser beam has been used in the above embodiment, for example, a laser beam and metal powder may be supplied to a surface of a substrate (the valve seat part S of the cylinder head H) using separate nozzles. In other words, while the laser processing head 2 (the coaxial nozzle 7 thereof) that serves as a powder supply unit configured to supply metal powder to a surface of a substrate and also serves as a laser emission unit configured to emit a laser beam to metal powder supplied from the powder supply unit and melt the metal powder has been used in the above embodiment, for example, the powder supply unit and the laser emission unit may be configured as separate devices. In addition, while metal powders with different components supplied from the supply devices 10 and 14 are sequentially discharged (supplied) from one coaxial nozzle 7 in the above embodiment, for example, metal powders with different components supplied from the supply devices 10 and 14 may be sequentially supplied to a surface of a substrate (the valve seat part S of the cylinder head H) using (two) separate nozzles.

In addition, it should be noted that the number of supply pipes through which metal powder is supplied to the discharge space 8 of the coaxial nozzle 7, positions thereof, and the like can be appropriately changed.

In addition, in the above embodiment, for clarification of the configuration, at a predetermined time (in the example shown in FIG. 8, a rotation angle of about 45°), supply of the first metal powder from the feeder 11 to the coaxial nozzle 7 and supply of the second metal powder from the feeder 15 are completely switched, only the first metal powder is supplied from the feeder 11 to form the beginning part and only the second metal powder is supplied from the feeder 15 to form the general part and the end part.

However, it should be noted that, when an Al solid solubility limit of metal powder used in processing of a beginning part of the clad layer is higher than an Al solid solubility limit of metal powder used in processing of a general part and an end part and wear resistance of a sheet surface and the like during production can be ensured, the first metal powder supplied from the feeder 11 and the second metal powder supplied from the feeder 15 may be mixed and used in a predetermined time width (in a range of predetermined rotation angles).

Experiments for Evaluating Function Features and a Quality Feature of Clad Layer and Results Thereof The inventors performed experiments in which a clad layer was formed on an Al substrate (a valve seat part of a cylinder head made of Al) using metal powders with different powder alloy components (Examples 1 to 8, and Comparative Examples 1 to 8) using the laser clad processing device 1 described above (for example, refer to FIG. 8 for processing conditions), and function features and a quality feature of the clad layer were evaluated.

Experiments of Observation of Cross Section of Clad Layer in Example 1 and Results Thereof First, the inventors performed experiments in which a clad layer was formed on an Al substrate (a valve seat part of a cylinder head made of Al) using metal powders with different powder alloy components (Example 1 and Comparative Example 1) and a cross section of the clad layer was observed.

Comparison Between Example 1 and Comparative Example 1

FIG. 11 shows powder alloy components of metal powders of Example 1 and Comparative Example 1. As can be understood from FIG. 11, in Example 1, all concentrations of Ni, Si, Mo, and Al in the first metal powder were set to be lower than those in the second metal powder. In addition, the metal powder in Comparative Example 1 was set to have substantially the same powder alloy components as the second metal powder in Example 1 (an Al amount was slightly different). That is, in Comparative Example 1, the clad layer was processed using a single metal powder having substantially the same powder alloy components as the second metal powder in Example 1.

Figure 5:
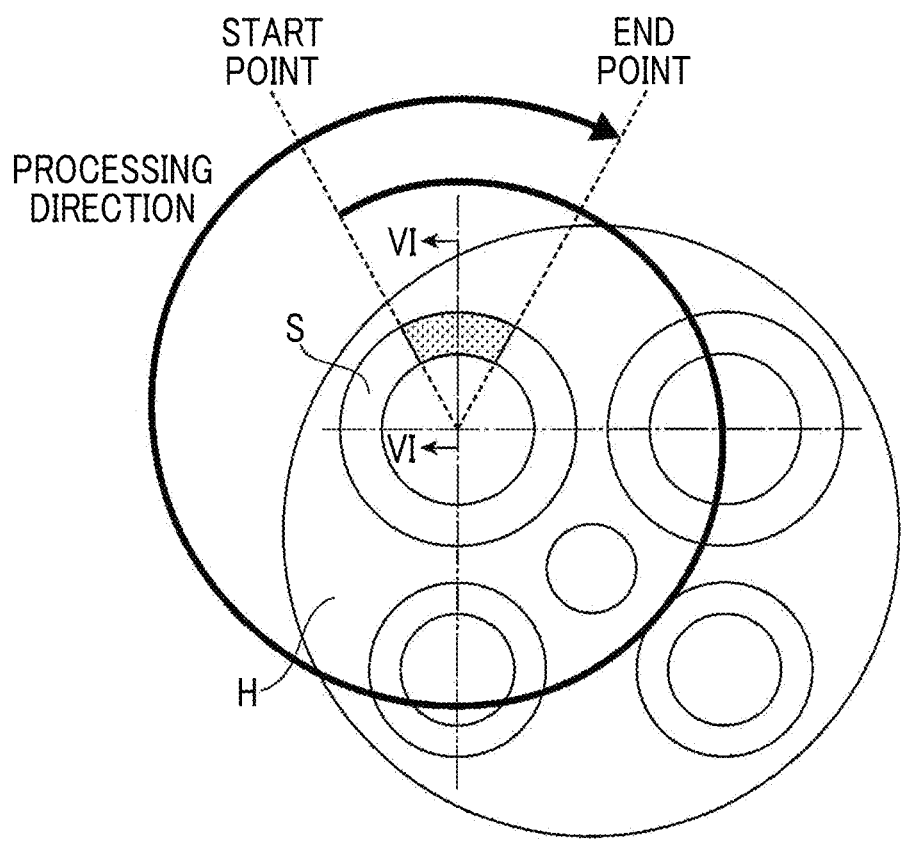
FIG. 5 is a plan view schematically showing a valve seat part of a cylinder head.
Figure 6:
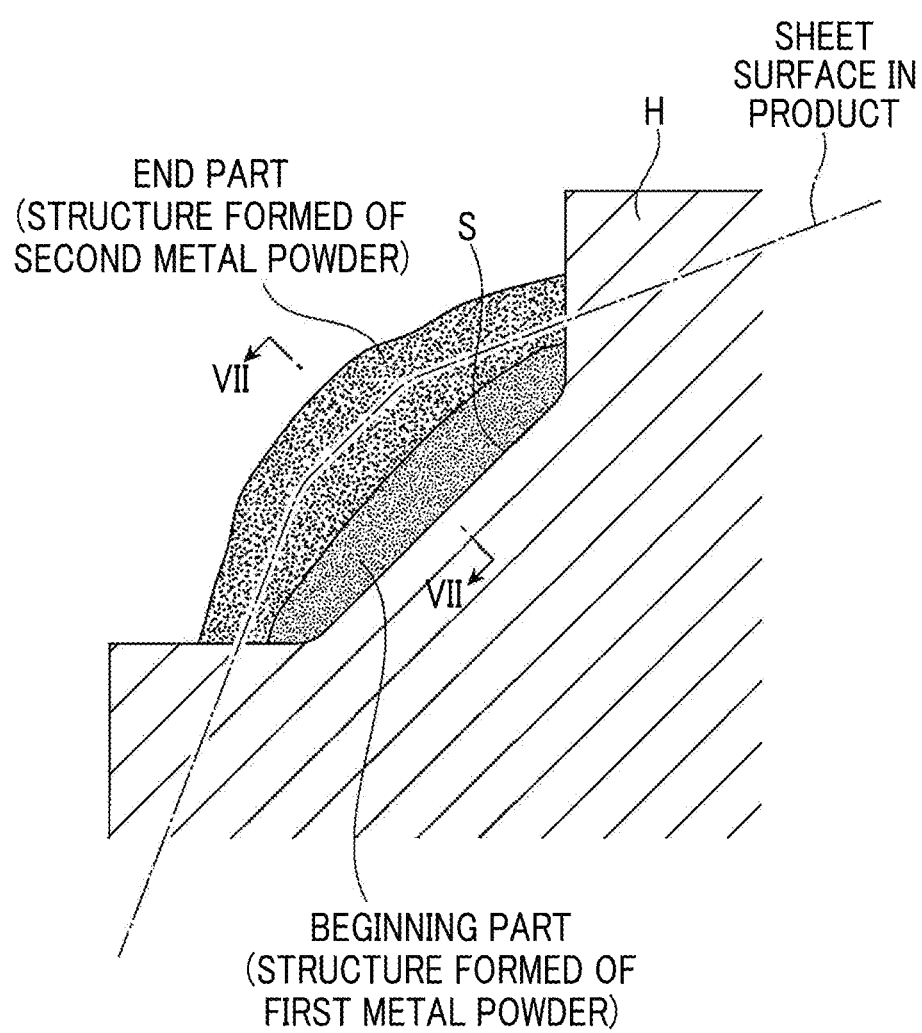
FIG. 6 is a cross-sectional view take along the line VI-VI in FIG. 5.
Figure 12A:
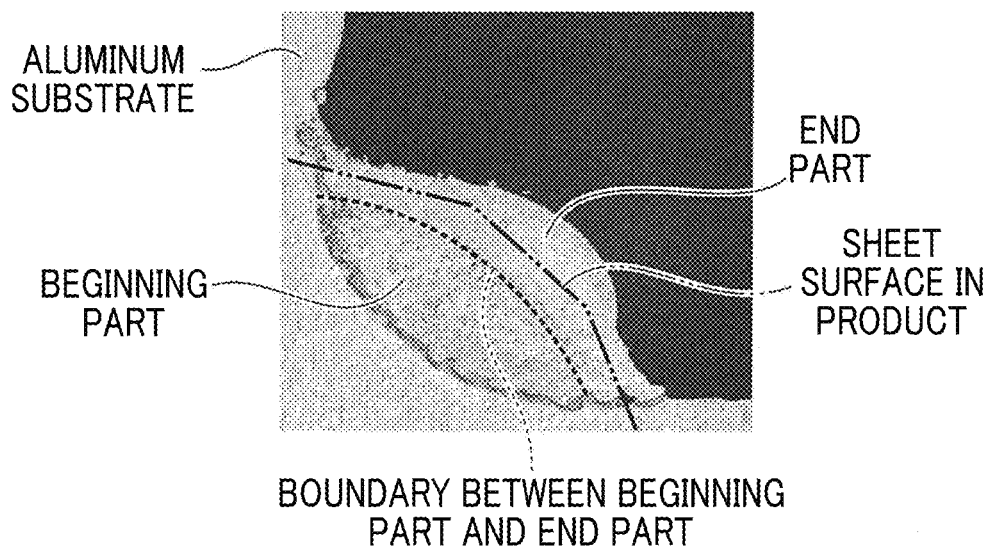
FIG. 12A is a structure picture diagram showing a cross section observation result of a cross section perpendicular to a processing direction in a clad layer in Example 1.
Figure 12B:
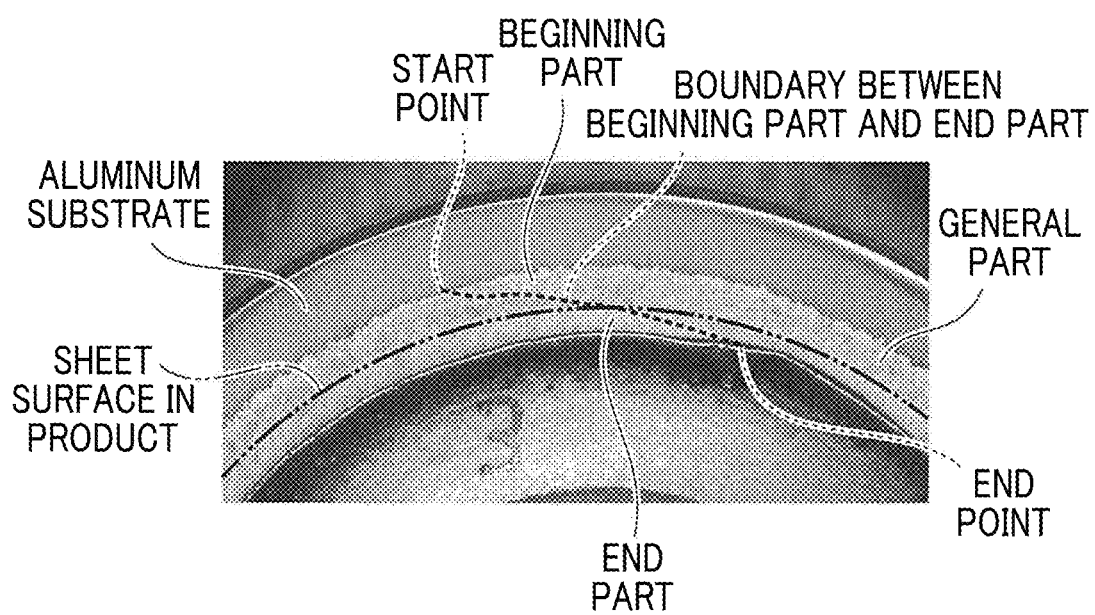
FIG. 12B is a structure picture diagram showing a cross section observation result of a cross section according to a processing method in the clad layer in Example 1.
Figure 12C:
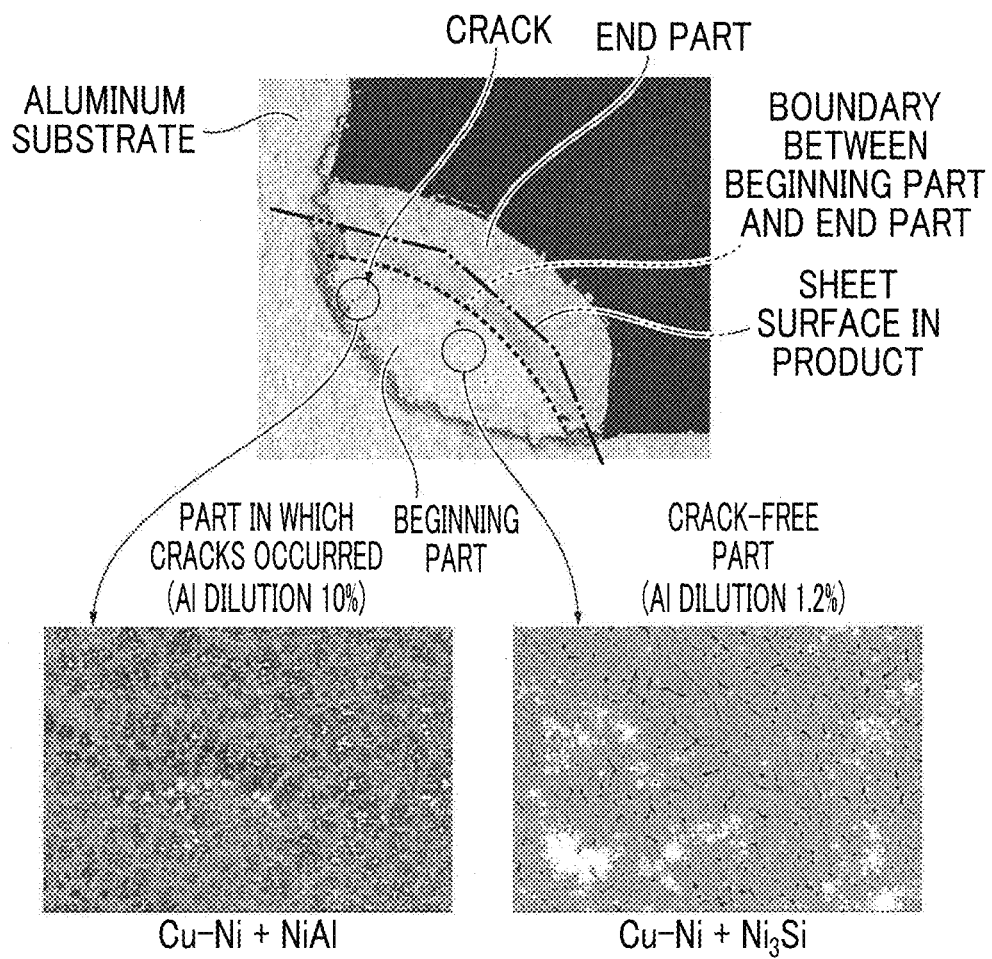
FIG. 12C is a structure picture diagram showing a cross section observation result of a cross section perpendicular to a processing direction in a clad layer in Comparative Example 1.
Figure 12D:
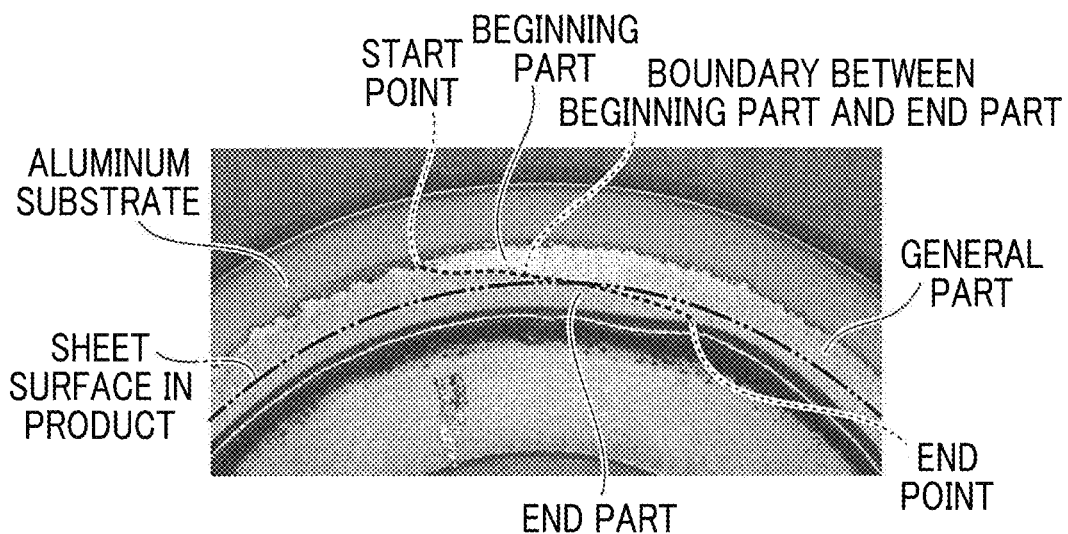
FIG. 12D is a structure picture diagram showing a cross section observation result of a cross section in a processing direction in the clad layer in Comparative Example 1.

FIG. 12A is a structure picture diagram showing a cross section observation result of a cross section (corresponds to a cross section taken along the line VI-VI in FIG. 5) perpendicular to a processing direction in the clad layer in Example 1 prepared in the present experiment. FIG. 12B is a structure picture diagram showing a cross section observation result of a cross section (corresponds to a cross section taken along the line VII-VII in FIG. 6) in a processing direction in the clad layer in Example 1. In addition, FIG. 12C is a structure picture diagram showing a cross section observation result of a cross section perpendicular to a processing direction in the clad layer in Comparative Example 1. FIG. 12D is a structure picture diagram showing a cross section observation result of a cross section in a processing direction in the clad layer in Comparative Example 1.

In Comparative Example 1 shown in FIGS. 12C and 12D, since more of intermetallic compound phases was precipitated in the beginning part, the occurrence of cracks that appear somewhat whiter than the general part and the end part was confirmed.

Here, it can be understood that, when an enlarged structure was examined in order to compare a structure of a part in which cracks occurred with a structure of a crack-free part in the structure in Comparative Example 1, an Al dilution was 10%, and as a result, there was less of ductile (resistant to cracking) Cu—Ni metallic phases, and intermetallic compound phases AlN with low ductility in which Al and Ni were combined were formed due to an increase in the Al concentration.

On the other hand, in Example 1 shown in FIGS. 12A and 12B, it was confirmed that a color of the beginning part was close to those of the general part and the end part and was not white, and there was little precipitation of intermetallic compound phases in which cracks are likely to occur.

Experiments of Measuring Hardness of Matrix of Clad Layers in Examples 2 to 8, Area Ratio of Hard Particles, and Occurrence of Cracks and Results Thereof Next, the inventors performed experiments in which a clad layer was formed on an Al substrate (a valve seat part of a cylinder head made of Al) using metal powders with different powder alloy components (Examples 2 to 8, and Comparative Examples 1 to 8), and the hardness of the matrix of the clad layer, an area ratio of hard particles, and the occurrence of cracks (the number of occurrences) were measured.

It was found that, in consideration of a part in which cracks occurred having a structure in Comparative Example 1 described above (refer to FIGS. 12C and 12D), when an amount of the Al component mixed into Cu exceeded a specified value (solid solubility limit), intermetallic compounds (AlNi and CuAl) were formed, and a decrease in elongation was caused and cracks were likely to occur in the structure. Thus, in the present experiment, evaluation was performed such that an Al solid solubility limit of Cu was defined, magnitude relationships between a Si amount, a Ni amount, a Mo amount, and an Al amount of powder alloy component compositions of the first metal powder and the second metal powder were set as control factors, and a hardness (Hv 0.1) of a matrix that prevents adhesion wear, an area ratio of hard particles that improve wear resistance, and the occurrence of cracks (the number of occurrences of cracks) were set as result indicators. Here, a higher matrix hardness and area ratio of hard particles as function features were beneficial with respect to adhesion wear, and a lower number of occurrences of cracks (that is, zero) appearing in the beginning part resulted in a better quality feature.

Here, the "Al solid solubility limit of Cu" is a limit value at which, when an amount of an Al component mixed into Cu exceeds this value, intermetallic compounds (AlNi and CuAl) are formed in Cu, and a decrease in elongation is caused and cracks are likely to occur, and is a value that is determined by compositional values for Ni, Si, and Mo in metal powder.

Comparison Between Example 2 and Comparative Example 1

FIG. 13 shows powder alloy components of metal powders of Example 2 and Comparative Example 1 and experimental results of function features and a quality feature thereof. As can be understood from FIG. 13, in Example 2, all concentrations of Ni, Si, Mo, and Al in the first metal powder were set to be lower than those in the second metal powder. In addition, the Al solid solubility limit of Cu in the first metal powder serving as a reference was higher than the Al component solid solubility limit of Cu in the second metal powder. In addition, the metal powder in Comparative Example 1 was set to have the same powder alloy components as the second metal powder in Example 2. That is, in Comparative Example 1, clad processing was performed using a single metal powder having the same powder alloy components as the second metal powder in Example 2.

It was confirmed that the same functions as in Comparative Example 1 could be realized with zero cracks in Example 2, but 19 cracks occurred in Comparative Example 1.

Comparison Between Example 2 and Comparative Example 2

FIG. 14 shows powder alloy components of metal powders of Example 2 and Comparative Example 2 and experimental results of function features and a quality feature thereof. As can be understood from FIG. 14, in Comparative Example 2, the metal powder was set to have the same powder alloy components as the first metal powder in Example 2. That is, in Comparative Example 2, clad processing was performed using a single metal powder having the same powder alloy components as the first metal powder in Example 2.

In Comparative Example 2, it was confirmed that, since a Si amount, a Ni amount, a Mo amount, and an Al amount were small (less than those in the second metal powder and equal to those in the first metal powder in Example 2), no cracks occurred, but both the matrix hardness and the area ratio of hard particles were lower than those in Example 2, and the function features were inferior to those of Example 2.

Comparison Between Example 3 and Comparative Example 3

FIG. 15 shows powder alloy components of metal powders of Example 3 and Comparative Example 3 and experimental results of function features and a quality feature thereof. As can be understood from FIG. 15, in Example 3, only a Si concentration (Si amount) of the first metal powder was set to be lower than that in the second metal powder. In addition, the Al solid solubility limit of Cu in the first metal powder serving as a reference was higher than the Al component solid solubility limit of Cu in the second metal powder. In addition, the metal powder in Comparative Example 3 was set to have the same powder alloy components as the second metal powder in Example 3.

Since the second metal powder in Example 3 and the metal powder in Comparative Example 3 had the same powder alloy components, Example 3 and Comparative Example 3 had the same function features (that is, both the matrix hardness and the area ratio of hard particles were the same). On the other hand, it was confirmed that, since a Si concentration (Si amount) in the first metal powder in Example 3 was relatively low, no cracks occurred in Example 3, but two cracks occurred in Comparative Example 3.

Comparison Between Example 4 and Comparative Example 4

FIG. 16 shows powder alloy components of metal powders of Example 4 and Comparative Example 4 and experimental results of function features and a quality feature thereof. As can be understood from FIG. 16, in Example 4, only a Mo concentration (Mo amount) in the first metal powder was set to be lower than that in the second metal powder. In addition, the Al solid solubility limit of Cu in the first metal powder serving as a reference was higher than the Al component solid solubility limit of Cu in the second metal powder. In addition, the metal powder in Comparative Example 4 was set to have the same powder alloy components as the second metal powder in Example 4.

Since the second metal powder in Example 4 and the metal powder in Comparative Example 4 had the same powder alloy components, Example 4 and Comparative Example 4 had the same function features (that is, both the matrix hardness and the area ratio of hard particles were the same). On the other hand, it was confirmed that, since a Mo concentration (Mo amount) in the first metal powder in Example 4 was relatively low, no cracks occurred in Example 4, but one crack occurred in Comparative Example 4.

Comparison Between Example 5 and Comparative Example 5

FIG. 17 shows powder alloy components of metal powders of Example 5 and Comparative Example 5 and experimental results of function features and a quality feature thereof. As can be understood from FIG. 17, in Example 5, only an Al concentration (Al amount) in the first metal powder was set to be lower than that in the second metal powder. In addition, the Al solid solubility limit of Cu in the first metal powder serving as a reference was higher than the Al component solid solubility limit of Cu in the second metal powder. In addition, the metal powder in Comparative Example 5 was set to have the same powder alloy components as the second metal powder in Example 5.

Since the second metal powder in Example 5 and the metal powder in Comparative Example 5 had the same powder alloy components, Example 5 and Comparative Example 5 had the same function features (that is, both the matrix hardness and the area ratio of hard particles were the same). On the other hand, it was confirmed that, since an Al concentration (Al amount) in the first metal powder in Example 5 was relatively low, no cracks occurred in Example 5, but 15 cracks occurred in Comparative Example 5.

Comparison Between Example 6 and Comparative Example 6

FIG. 18 shows powder alloy components of metal powders of Example 6 and Comparative Example 6 and experimental results of function features and a quality feature thereof. As can be understood from FIG. 18, in Example 6, Si and Mo concentrations (a Si amount and a Mo amount) in the first metal powder were set to be lower than those in the second metal powder. In addition, the Al solid solubility limit of Cu in the first metal powder serving as a reference was higher than the Al component solid solubility limit of Cu in the second metal powder. In addition, the metal powder in Comparative Example 6 was set to have the same powder alloy components as the second metal powder in Example 6.

Since the second metal powder in Example 6 and the metal powder in Comparative Example 6 had the same powder alloy components, Example 6 and Comparative Example 6 had the same function features (that is, both the matrix hardness and the area ratio of hard particles were the same). On the other hand, it was confirmed that, since a Si concentration and a Mo concentration (a Si amount and a Mo amount) in the first metal powder in Example 6 were relatively low, no cracks occurred in Example 6, but five cracks occurred in Comparative Example 6.

Comparison Between Example 7 and Comparative Example 7

FIG. 19 shows powder alloy components of metal powders of Example 7 and Comparative Example 7 and experimental results of function features and a quality feature thereof. As can be understood from FIG. 19, in Example 7, Si and Ni concentrations (a Si amount and a Ni amount) in the first metal powder were set to be lower than those in the second metal powder. In addition, the Al solid solubility limit of Cu in the first metal powder serving as a reference was higher than the Al component solid solubility limit of Cu in the second metal powder. In addition, the metal powder in Comparative Example 7 was set to have the same powder alloy components as the second metal powder in Example 7.

Since the second metal powder in Example 7 and the metal powder in Comparative Example 7 had the same powder alloy components, Example 7 and Comparative Example 7 had the same function features (that is, both the matrix hardness and the area ratio of hard particles were the same). On the other hand, it was confirmed that, since a Si concentration and a Ni concentration (a Si amount and a Ni amount) in the first metal powder in Example 7 were relatively low, no cracks occurred in Example 7, but five cracks occurred in Comparative Example 7.

Comparison Between Example 8 and Comparative Example 8

FIG. 20 shows powder alloy components of metal powders of Example 8 and Comparative Example 8 and experimental results of function features and a quality feature thereof. As can be understood from FIG. 20, Si, Ni, and Mo concentrations (a Si amount, a Ni amount, and a Mo amount) in the first metal powder in Example 8 were set to be lower than those in the second metal powder. In addition, the Al solid solubility limit of Cu in the first metal powder serving as a reference was higher than the Al component solid solubility limit of Cu in the second metal powder. In addition, the metal powder in Comparative Example 8 was set to have the same powder alloy components as the second metal powder in Example 8.

Since the second metal powder in Example 8 and the metal powder in Comparative Example 8 had the same powder alloy components, Example 8 and Comparative Example 8 had the same function features (that is, both the matrix hardness and the area ratio of hard particles were the same). On the other hand, it was confirmed that, since a Si concentration, a Ni concentration, and a Mo concentration (a Si amount, a Ni amount, and a Mo amount) in the first metal powder in Example 8 were relatively low, no cracks occurred in Example 8, but four cracks occurred in Comparative Example 8.

That is, based on the experimental results, it was verified that, when a concentration of at least one of Si, Ni, Mo, and Al in the first metal powder forming the clad layer was set to be lower than that in the second metal powder, it was possible to reliably reduce cracking in the beginning part of the clad layer related to the quality while maintaining functions (matrix hardness and the area ratio of hard particles).

While the embodiments of the present disclosure have been described above in detail with reference to the drawings, specific configurations are not limited to the above embodiments, and various design modifications within the scope without departing from the scope and spirit of the present disclosure are included in the present disclosure.

What is claimed is:
1. A method of producing a clad layer comprising:
   supplying metal powder that is copper-based metal powder to a surface of a substrate made of aluminum or aluminum alloy, emitting a laser beam to the metal powder, and melting the metal powder, the metal powder including a first metal powder and a second metal powder; and moving a supply position of the metal powder and an emission position of the laser beam in a predetermined direction along the surface of the substrate and forming the clad layer on the surface of the substrate in the predetermined direction, wherein the first metal powder is supplied from a first feeder to the substrate to form a beginning part of the clad layer, and after the beginning part is formed, the second metal powder is supplied from a second feeder to the substrate, and a concentration of at least one of Si, Ni, Mo, and Al in the first metal powder is lower than a concentration of the at least one of Si, Ni, Mo, and Al in the second metal powder so that a powder alloy components of the first metal powder are different from powder alloy components of the second metal powder, and wherein the second feeder is different from the first feeder.

2. The method according to claim 1, wherein concentrations of Si, Ni, Mo, and Al in the first metal powder are lower than concentrations of Si, Ni, Mo, and Al in the second metal powder, respectively.

3. The method according to claim 1, wherein a Si concentration in the first metal powder is lower than a Si concentration in the second metal powder.

4. The method according to claim 1, wherein a Mo concentration in the first metal powder is lower than a Mo concentration in the second metal powder.

5. The method according to claim 1, wherein an Al concentration in the first metal powder is lower than an Al concentration in the second metal powder.

6. The method according to claim 1, wherein Si and Mo concentrations in the first metal powder are lower than Si and Mo concentrations in the second metal powder, respectively.

7. The method according to claim 1, wherein Si and Ni concentrations in the first metal powder are lower than Si and Ni concentrations in the second metal powder, respectively.

8. The method according to claim 1, wherein Si, Ni, and Mo concentrations in the first metal powder are lower than Si, Ni, and Mo concentrations in the second metal powder, respectively.

9. The method according to claim 1, wherein an Al solid solubility limit of the first metal powder is higher than an Al solid solubility limit of the second metal powder.

10. The method according to claim 1, wherein a laser output to the first metal powder is set to be lower than a laser output to the second metal powder.

11. The method according to claim 1, wherein the second metal powder is supplied on the beginning part of the clad layer to form an end part of the clad layer.

12. The method according to claim 1, wherein, when the first metal powder is supplied, the second metal powder is not supplied.

13. The method according to claim 1, wherein, when the second metal powder is supplied, the first metal powder is not supplied.

* * * * *